United States Patent [19]
Mitsui et al.

[11] 3,952,219
[45] Apr. 20, 1976

[54] COMPACT MOTOR

[75] Inventors: Yoshihiro Mitsui; Kenichiro Arai; Hiroshi Kamakura, all of Matsumoto, Japan

[73] Assignees: Kabushiki Kaisha Suwa Seikosha, Tokyo; Shinshu Seiki Kabushiki Kaisha, both of Japan

[22] Filed: Jan. 17, 1975

[21] Appl. No.: 541,985

Related U.S. Application Data
[63] Continuation of Ser. No. 360,700, May 15, 1973, abandoned.

[30] Foreign Application Priority Data
May 15, 1972  Japan.................................. 47-47829
May 30, 1972  Japan.................................. 47-53534

[52] U.S. Cl................................ 310/156; 310/67 R
[51] Int. Cl.²............................................ H02K 21/12
[58] Field of Search............. 310/156, 179, 40 MM, 310/180, 67, 181, 46, 185, 90, 184, 152, 187, 163–166, 261, 254, 264, 257, 265, 258, 259; 324/146

[56] References Cited
UNITED STATES PATENTS

| | | | |
|---|---|---|---|
| 2,582,652 | 1/1952 | Petersen | 310/164 |
| 2,672,564 | 3/1954 | Krasno | 310/46 |
| 2,687,482 | 8/1954 | Harmon | 310/156 |
| 3,443,135 | 5/1969 | Lombard | 310/152 |
| 3,484,635 | 12/1969 | MacKallor | 310/67 |
| 3,519,859 | 7/1970 | Morreale | 310/152 |
| 3,636,392 | 1/1972 | Gerry | 310/67 |

FOREIGN PATENTS OR APPLICATIONS
1,542,071  10/1968  France.............................. 310/156

*Primary Examiner*—R. Skudy
*Attorney, Agent, or Firm*—Blum, Moscovitz, Friedman & Kaplan

[57] ABSTRACT

A compact motor having a rotor positioned in the magnetic field of a stator, the stator being formed with at least two magnetic pole members in registration with the rotor and having yoke portions extending in a direction parallel to the axis of rotation of the rotor about which windings are mounted. A yoke member mechanically and magnetically couples said pole members.

7 Claims, 7 Drawing Figures

COMPACT MOTOR

This is a continuation of application Ser. No. 360,700 filed May 15, 1973 now abandoned.

BACKGROUND OF THE INVENTION

This invention relates to a compact motor adapted to minimize self-start time and to provide high output energies. In the art, motors are frequently formed with a plurality of poles circumferentially spaced about a rotor, each pole having a portion extending radially relative to the axis of rotation of the rotor about which coils are mounted. The size of the coils which may be mounted on stators of this construction is limited, making it difficult to increase the output of the motor without substantially increasing the size of the motor or risking the generation of increased heat in the windings. Further, the paths followed by the flux of the prior art motors is relatively long and such motors are relatively expensive to manufacture.

By providing a stator having pole members formed with yoke portions extending substantially parallel to the axis of the rotor, about which the windings are mounted, the foregoing deficiencies in the prior art are avoided.

SUMMARY OF THE INVENTION

Generally speaking, in accordance with the invention, a compact motor is provided having a rotor formed with permanent magnet means, a plurality of magnetic pole members positioned at least in part in facing relation to said rotor permanent magnet means, said pole members each having a yoke portion extending substantially parallel to the axis of rotation of said rotor about which windings are wound, and a yoke member magnetically and mechanically coupling said pole members to close the flux path extending through said rotor pole members.

The flux portions of said pole members are positioned out of registration with said rotor. Said yoke member may interconnect said pole members at the respective ends of said yoke portions thereof, a non-magnetic coupling member joining the opposite ends thereof.

Accordingly, it is an object of this invention to provide a compact motor having a reduced self-start time while generating a high output.

Another object of the invention is to provide a compact motor having simplified construction and increased magnetomotive force.

Still another object of the invention is to provide a compact motor having reduced radial dimensions and formed of a minimum number of parts.

Still another object of the invention is to provide a relatively inexpensive and simple compact motor construction.

Still other objects and advantages of the invention will in part be obvious and will in part be apparent from the specification and drawings.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
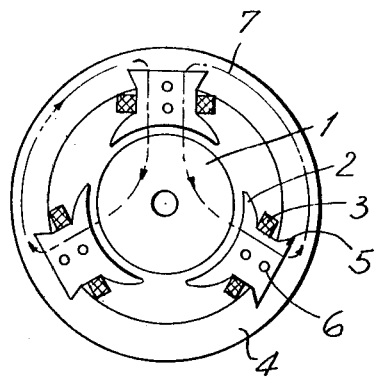
FIG. 1 is a sectional view of a prior art motor.

Referring now to FIG. 1, a prior art motor construction is depicted. Said motor includes a rotor 1 formed of a permanent magnet, three magnetic poles 2 circumferentially spaced about the periphery of motor 1 and supported by a yoke 4. Each magnetic pole is formed with a portion extending radially relative to the axis of rotation of rotor 1 about which is wound a winding 3. When windings 3 are excited, a magnetic circuit illustrated by chain line 7 is formed between adjacent pole members, one-half the path passing through the rotor while the other half of the path extends in the circumferential direction through yoke 4. Motors characterized by the provision of a portion of the magnetic flux path extending in the circumferential direction relative to the rotor are characterized by a number of defects. Thus, where it is desired to increase the magnetomotive force of the winding 3 to design a motor able to generate a comparatively high output with the use of low input power, the conventional motor construction limits the approaches available due to the limited volume available for winding 3. Thus, the output may be increased either by means of increasing the input power, which causes the generation of heat in the windings, or by increasing the volume of the windings leaving the input power as it is, an arrangement which increases the resistance of the magnetic circuit and reduces efficiency. Both of these approaches result in increased costs.

Further, the prior art motors represented by FIG. 1 have proved difficult to manufacture. One area of difficulty is the mounting of windings 3 on magnetic pole 2. Such winding can be loosely wound and passed about projections 5 and then secured in position by wedges or screws. Another approach requires the use of a special tool for winding windings 3 about magnetic pole 2. Both of these approaches are relatively expensive. Magnetic poles 2 are usually formed of thin plates secured together as a unit by means of pins 6 or the like. The mounting of such poles to yoke 4 so as to maintain an accurate gap between the pole faces and rotor 1 is difficult.

Figure 2:
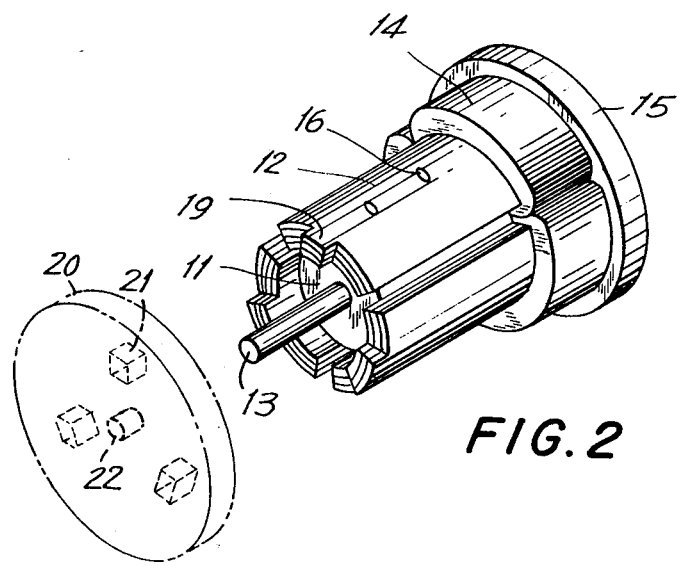
FIG. 2 is a perspective view of a compact motor in accordance with the invention.
Figure 3:
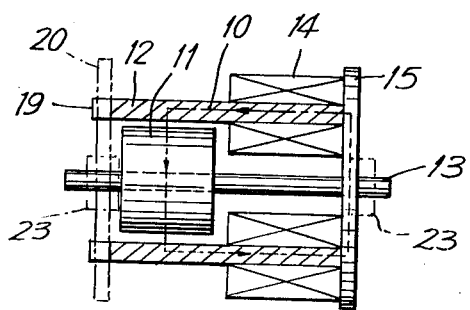
FIG. 3 is a sectional view of the motor of FIG. 2 taken along the axis of the rotor.

One embodiment of the compact motor in accordance with the invention, which avoids the foregoing defects, is depicted in FIGS. 2 and 3. Said motor includes a rotor 11 formed of permanent magnets about which are disposed a plurality of magnetic pole members 12. Said magnetic pole members are formed with a relatively flat thin configuration and extend in a direction substantially parallel to the axis of rotation of rotor 11 defined by shaft 13. Windings 14 are wound about a yoke portion of each magnetic pole 12, which yoke portion does not overlap rotor 11. A yoke member 15 formed of magnetic material magnetically and mechanically couples the outer ends of the yoke portion of said pole members. The magnetic circuit thus produced by the excitation of windings 14 extends along the length of one of said pole members including the yoke portion thereof to the gap between said pole member and rotor 11. The magnetic field extends through said gap, said rotor and the gap between said rotor and another of said pole members. The magnetic flux passes along the length of said other pole member including the yoke portion thereof to yoke member 15 which closes the magnetic circuit back to the first-mentioned of said pole members.

The foregoing arrangement permits the construction of a motor suitable for driving a printer, a disc or the like requiring small size, short self-start time and high output. Such applications require the reduction of the inertia of the motor to minimize self-start time which results in a reduction in the magnetic flux. This reduction necessitates an increase in the magnetomotive force of the stator to increase the output, thereby requiring an increase in the volume of windings 14. Since the yoke portions of pole members 12 are not in facing relation to rotor 11, the windings can occupy a larger volume than in conventional motors. Further, if desired, yoke portions of each pole member may extend in both axial direction relative to rotor 11, and windings may be wound about both yoke portions without interferring with rotor 11. This arrangement also results in a reduction of magnetic resistance in response to a reduction in leakage, yokes members being provided at each end of the pole members. In any event, the magnetic resistance of the arrangement in accordance with the invention is at least as low as that of the conventional motor constructions due to the short magnetic circuits.

Figure 4:
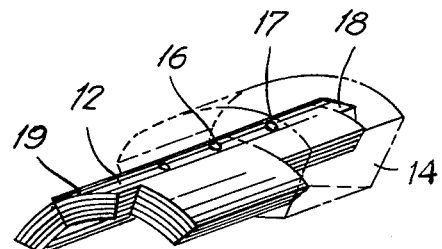
FIG. 4 is a perspective view of a pole member of the motor of FIG. 2.

One embodiment of the pole member in accordance with the invention is depicted in FIG. 4. The pole member is provided with a yoke portion 17 about which winding 14, shown in chain lines, are wound. A projection 18 projects axially from the end of yoke portion 17 for engagement in an aperture formed in yoke member 15 for the mounting and positioning of the pole member 12. A second projection 19 extends from the opposite end of the pole member for receipt within an aperture 21 in a coupling board member 20 formed of a non-magnetic material (FIGS. 2 and 3). This mounting technique insures accurate positioning of the respective pole members as well as the accurate dimensioning and positioning of the gap between the respective pole members and rotor 11. Coupling board member 20 is formed with a central aperture 22 for receipt of shaft 13 of rotor 11, or for receipt of one of bearings 23 (FIG. 3) supporting said rotor shaft. Coupling board member 20 would not be required where yoke portions 17 projected from both ends of pole member 12 so that windings are wound on either side of rotor 11, in which case a magnetic yoke member 15 would support each end of the pole members.

Figure 5:
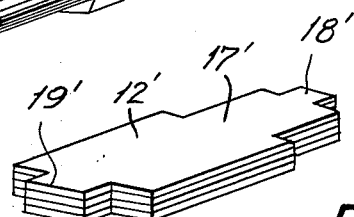
FIGS. 5 and 6 are perspective views of alternate embodiments of the pole member and yoke respectively in accordance with the invention.

Although the embodiment of the pole member depicted in FIG. 4 is formed from an assembly of plates fastened together by pin 16, a single plate can be substituted therefor, thereby reducing the cost of manufacture at the cost of some decreased inefficiency. In the embodiments depicted in FIGS. 2-4, the thin pole members 12 were formed with an arcuate bend in the lateral direction thereof to conform to the circumferential configuration of rotor 11. In the embodiment of the pole member in accordance with the invention depicted in FIG. 5, the bend has been eliminated so that pole member 12' is essentially flat, but is still provided with projections 18' and 19' and yoke portion 17'. Yoke member 15 is preferably formed with a flat board of soft magnetic material and may support of bearing 23 (FIG. 3) as well as forming a part of the magnetic circuit.

Figure 6:
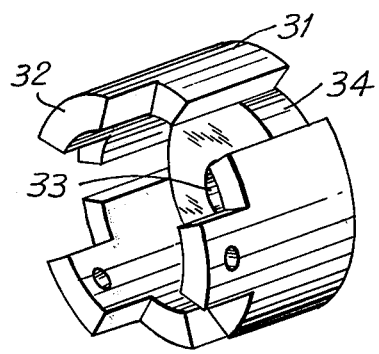

FIG. 6 depicts an alternate construction of the yoke member in accordance with the invention wherein yoke member 34 is formed integral with winding receiving portions 31 extending essentially parallel to the axis of the shaft of a rotor which would be received in aperture 33. Projections 32 projecting from the end of each of the winding portions 31 would be coupled to a pole member in registration with the rotor. The windings would be wound about portion 31 of yoke 34. In all of the foregoing embodiments, the windings can be pre-wound about bobbins which are then fitted onto yoke portion 17 or winding receiving portions 31, thereby facilitating the assembly of the motor in accordance with the invention.

Figure 7:
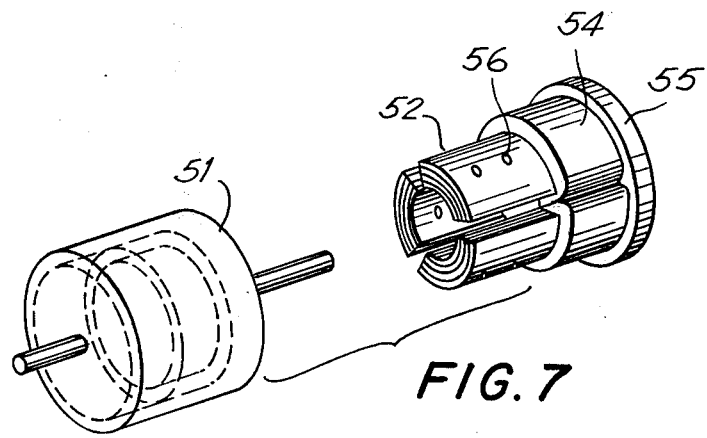
FIG. 7 is an exploded perspective view of an alternate embodiment of the motor in accordance with the invention.

Still another embodiment in the motor in accordance with the invention is depicted in FIG. 7, wherein the rotor 51 is of hollow construction dimensioned to receive a stator formed from pole members 52, windings 54 and yoke member 55. The pole members are formed as described above from a stack of thin plates held together by pins 16. The rotor 51 would be formed of a permanent magnet, and the motor would function in the same manner as the motors of the previous embodiments.

Detection means could be provided in the motors depicted for synchronous rotation with rotary shaft 13 to detect the position thereof for the selective excitation of the respective windings. Further, it is noted that while the motors depicted are provided with three pole members, the actual number of pole members depends on the desired characteristics of the motor and does not impose a limitation on the disclosed invention.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A compact motor adapted to produce mechanical energy in response to an excitation signal applied thereto comprising a permanent magnet rotor rotatable about an axis, a plurality of magnetic pole members circumferentially spaced about the axis of rotation of said rotor, said pole members having a uniform thickness and an arcuate cross section taken in plane substantially normal to the axis of rotation of said rotor, said pole members each further including a first lengthwise portion facing said permanent magnet rotor and a second lengthwise portion of a width substantially less than said first lengthwise portion extending substantially parallel to the axis of rotation of said rotor and substantially out of facing relation with said permanent magnet rotor; excitation winding means mounted about the second lengthwise portion of each pole member out of facing relationship with said permanent magnet rotor, said excitation windings having said excitation signal applied thereto; and a yoke member mechanically supporting said pole members and closing a flux path through said rotor and pole members to effect rotation of said rotor in response to an excitation signal applied to said excitation windings.

2. A compact motor as claimed in claim 1 wherein said first lengthwise portions of said pole members in facing relationship with said permanent magnet rotor have sufficient width to minimize the intervals therebetween.

3. A compact motor as recited in claim 2 including a coupling member formed of non-magnetic material mechanically coupling said pole members in a region such that said rotor is positioned intermediate said coupling member and yoke member.

4. A compact motor as recited in claim 3, wherein each of said pole members includes a projecting portion projecting substantially axially from the side thereof opposite from the yoke member, said coupling member including corresponding apertures for receipt of said projection portions for mechanically coupling with said pole members.

5. A compact motor as recited in claim 2, wherein each said pole member includes a further reduced width lengthwise portion extending substantially parallel to the axis of rotation of said rotor on a side of said permanent magnet rotor opposite from said second lengthwise portion of said pole member and out of facing relationship with said rotor and, further excitation windings mounted about each of the further reduced width lengthwise portions, and a further yoke member magnetically and mechanically coupling said further lengthwise portions of said pole members at a point therein positioned to close a flux path extending through said rotor and said further lengthwise portions bearing said further excitation windings.

6. A compact motor as recited in claim 2 wherein said permanent magnet rotor is provided with a cylindrical bore, said pole members being received within said cylindrical bore.

7. A compact motor as recited in claim 1, wherein each of said pole members includes a projecting portion projecting substantially axially from the side thereof opposite from the coupling member, said yoke member including corresponding apertures for receipt of said projecting portions for mechanically coupling with said pole members.

* * * * *